UNITED STATES PATENT OFFICE.

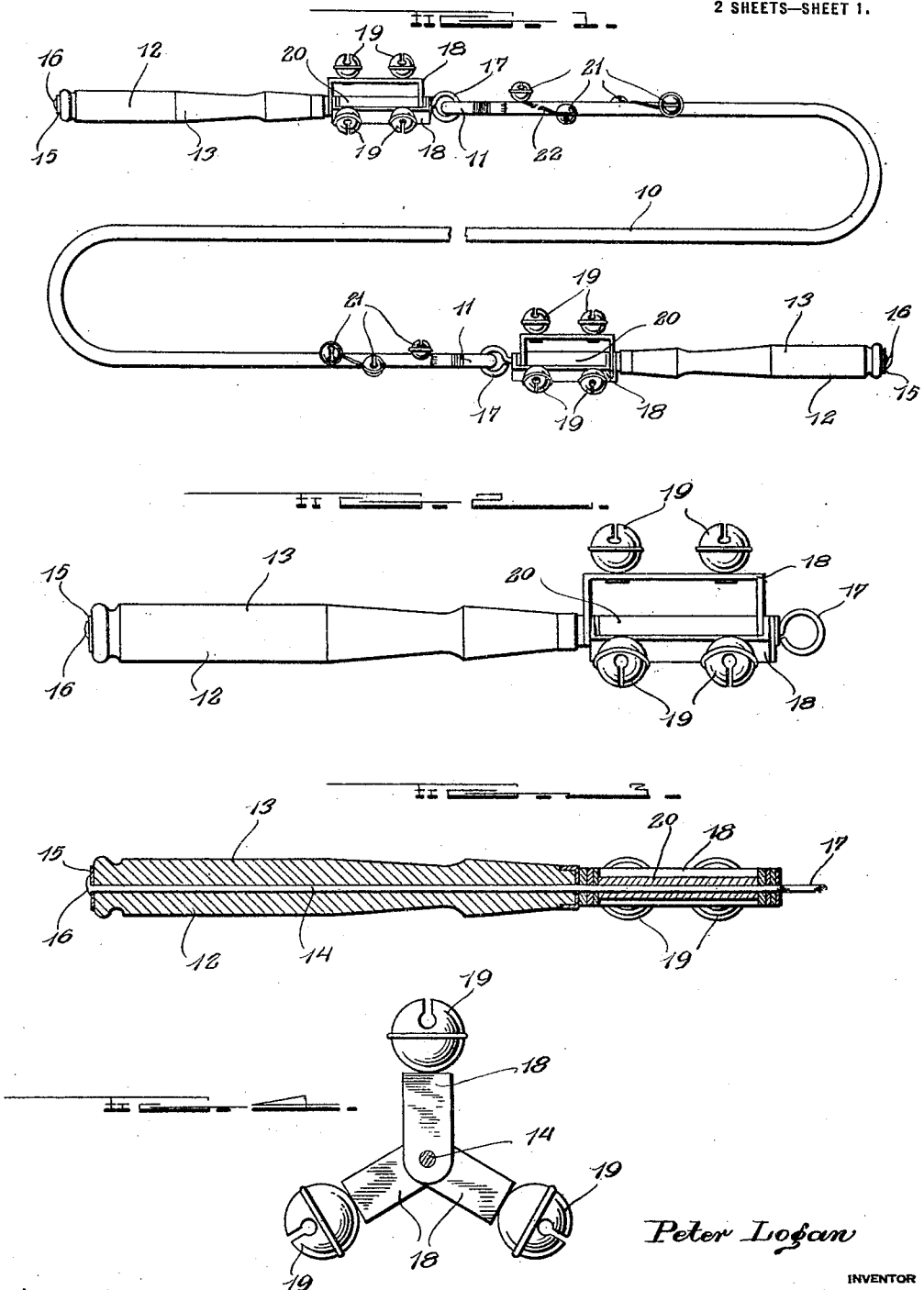

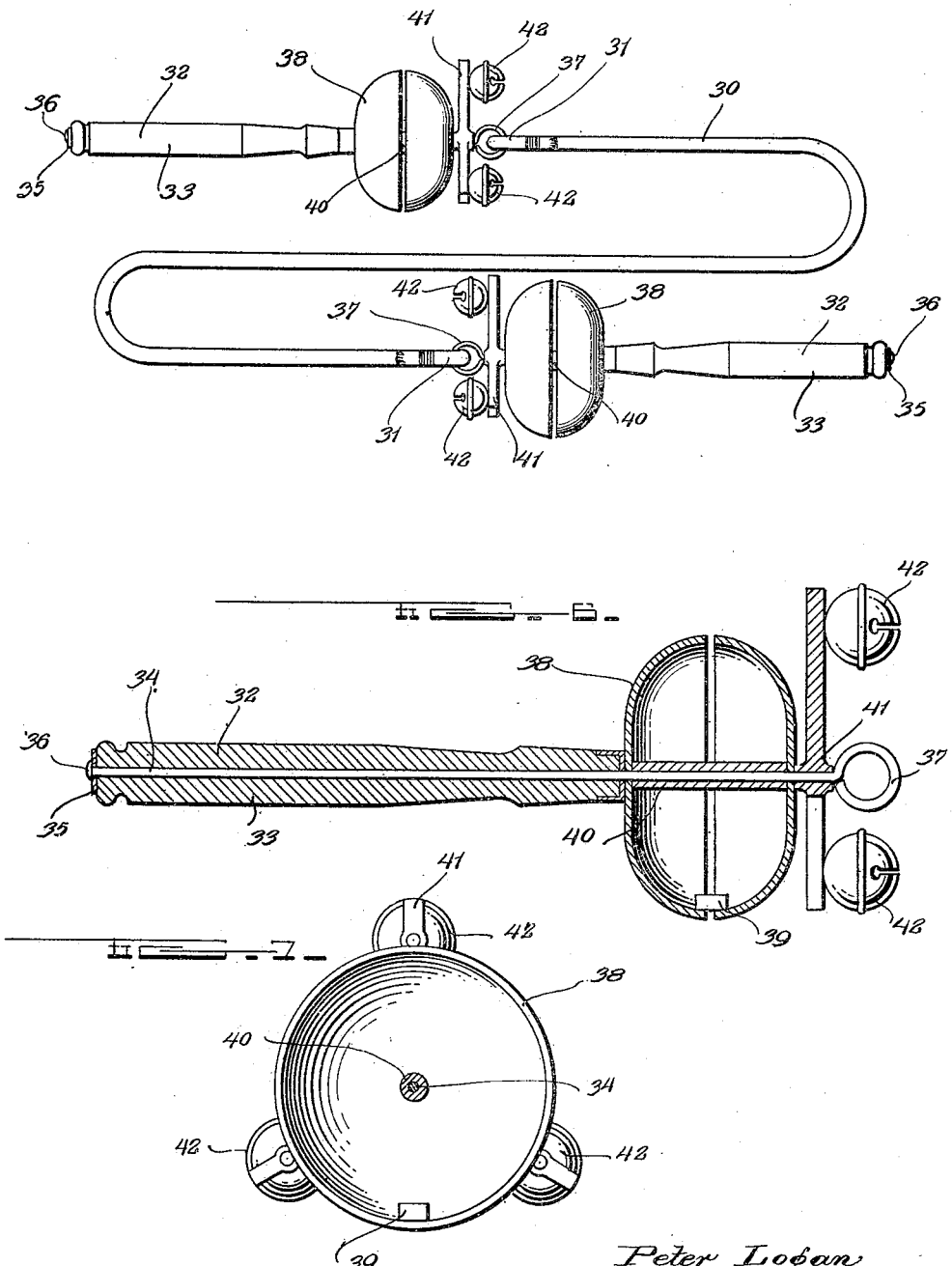

PETER LOGAN, OF HAMMOND, INDIANA.

JUMPING-ROPE.

1,371,915. Specification of Letters Patent. Patented Mar. 15, 1921.

Application filed April 26, 1920. Serial No. 376,703.

*To all whom it may concern:*

Be it known that I, PETER LOGAN, a citizen of the United States, residing at Hammond, in the county of Lake, and State of Indiana, have invented new and useful Improvements in Jumping-Ropes, of which the following is a specification.

This invention relates to amusement devices, particularly to jumping or skipping ropes, and has for its object the provision of a jumping rope provided at its ends with handles carrying bells which will jingle when the rope is in use and consequently serve to amuse and entertain the user.

An important object is the provision of a device of this character in which the bell supporting members are rotatably mounted with respect to the handles whereby they will have increased freedom of movement.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is an elevation of a jumping rope constructed in accordance with my invention and showing one form thereof, Fig. 2 is an enlarged elevation of one of the handle members, Fig. 3 is a longitudinal sectional view therethrough, Fig. 4 is a cross sectional view, Fig. 5 is a view similar to Fig. 1, showing a modified form of handle members, Fig. 6 is a longitudinal sectional view through this form of handle member, and Fig. 7 is a cross sectional view.

Referring more particularly to the drawings and especially to the form shown in Figs. 1 to 4, inclusive, the numeral 10 designates a rope which is formed at its ends with eyes or loops 11. The numeral 12 designates the handle members, each of which includes a handle proper 13 through which extends a revoluble rod 14 having one end provided with a washer 15 and upset, as shown at 16, and having its other end extending a considerable distance beyond the handle proper and formed with an eye or loop 17 engaged with the eye or loop 11 at the end of the rope. Disposed upon the portion of the rod 14 which projects beyond the handle is a plurality of U-shaped yokes 18 which have their arms revolubly engaged upon the rod 14 and which have rotatably mounted thereon bells 19 of the sleigh bell type. A spacing sleeve 20 surrounds the rod 14 between the arms of the yokes 18, as shown.

I may also find it advisable to make use of a plurality of bells 21 secured together by a flexible wire 22 or the like which is laced through the convolutions of the rope at the end portions thereof adjacent the handle members 12. The rope thus formed is used in the usual manner and the ringing of the bells 19 and 21 will increase the entertainment and amusement derived. As the handle members are moved in the use of the device, it will be apparent that the rotatability of the yokes 18 upon the rod 14 will increase the freedom of movement of the bells and will consequently add to their efficiency as noise makers.

Referring to the form shown in Figs. 5, 6 and 7, the numeral 30 designates the rope which is provided at its end portions with loops or eyes 31. The numeral 32 designates the handle members which are connected with the ends of the rope and each of these handle members includes a handle proper 33 through which extends a rod 34 having one end provided with a washer 35 and upset, as shown at 36. The other end of the rod extends an appreciable distance beyond the handle proper and is formed with an eye or loop 37 engaged within the eye 31 at the end of the rope. Rotatably mounted upon this projecting portion of the rope 34 are bell members 38 of the telephone type between which is mounted a movable member 39 constituting a clapper. These bell members 38 are rotatable upon the rod 34 and are spaced apart by a sleeve 40 which surrounds the rod 34. Disposed between the outermost bell member 38 and the eye or loop 37 is a spider 41 which is rotatable upon the rod 14 and which carries a plurality of rotatably mounted bells 42 of the sleigh bell type.

In the use of this form of the device it will be seen that as the rope 30 is swung, in skipping or jumping, the bell members 38 and 40 will jingle. It will also be apparent that, owing to the rotatability of the various parts, and specially the spiders 41 which carry the bells 42, there will be no binding of the parts and there will be consequently nothing to detract from the noise making efficiency of the bells.

While I have shown and described the preferred embodiments of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a rope, handle members connected with the ends thereof and each formed as a handle proper, a rod extending through and beyond one end of the handle member, eyes formed on said projecting ends for connection with the ends of the rope, a support rotatable upon the projecting end of the rod, and a plurality of bells rotatably mounted upon the support.

2. A device of the character described comprising a rope formed at its ends with eyes, and a handle member connected with each end of the rope and including a handle proper, a rod extending therethrough and beyond one end thereof, the terminal of the projecting portion of the rod being formed with an eye engaging within the eye at the end of the rope, a plurality of U-shaped yokes having their arms revolubly mounted upon the projecting portion of the rod, a spacing sleeve surrounding the rod between the arms of the yokes, and a plurality of bells revolubly mounted upon each yoke.

In testimony whereof I affix my signature.

PETER LOGAN.